(12) United States Patent
Grimm et al.

(10) Patent No.: US 11,299,086 B2
(45) Date of Patent: Apr. 12, 2022

(54) METHOD FOR OPERATING A LIGHTING DEVICE IN A MOTOR VEHICLE

(71) Applicant: Bayerische Motoren Werke Aktiengesellschaft, Munich (DE)

(72) Inventors: Stev Grimm, Munich (DE); Thomas Vogl, Munich (DE); Christian Wagner, Augsburg (DE); Katrin Wildenhof, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/058,486

(22) PCT Filed: Jul. 8, 2019

(86) PCT No.: PCT/EP2019/068235
§ 371 (c)(1),
(2) Date: Nov. 24, 2020

(87) PCT Pub. No.: WO2020/020616
PCT Pub. Date: Jan. 30, 2020

(65) Prior Publication Data
US 2021/0197710 A1 Jul. 1, 2021

(30) Foreign Application Priority Data
Jul. 24, 2018 (DE) ...................... 10 2018 212 274.1

(51) Int. Cl.
*H05B 45/20* (2020.01)
*B60Q 1/14* (2006.01)
(Continued)

(52) U.S. Cl.
CPC ............ *B60Q 1/1423* (2013.01); *B60Q 3/80* (2017.02); *H05B 45/20* (2020.01); *H05B 47/18* (2020.01); *B60Q 2400/20* (2013.01)

(58) Field of Classification Search
CPC ........ H05B 45/00; H05B 45/20; H05B 47/00; H05B 47/10; H05B 47/18; B60Q 1/1423; B60Q 3/80; B60Q 2400/20
See application file for complete search history.

(56) References Cited

U.S. PATENT DOCUMENTS

| 2004/0155608 A1 | 8/2004 | Trinschek et al. |
| 2014/0001953 A1 | 1/2014 | Kangarakis et al. |

(Continued)

FOREIGN PATENT DOCUMENTS

| DE | 10 2009 000 130 A1 | 7/2010 |
| DE | 10 2012 015 969 A1 | 2/2013 |

(Continued)

OTHER PUBLICATIONS

International Search Report (PCT/ISA/210) issued in PCT Application No. PCT/EP2019/068235 dated Sep. 5, 2019 with English translation (four (4) pages).

(Continued)

*Primary Examiner* — Jimmy T Vu
(74) *Attorney, Agent, or Firm* — Crowell & Moring LLP

(57) ABSTRACT

A lighting device in a motor vehicle includes a number of illumination devices, which each generate colored light via a plurality of color channels. The illumination devices can be controlled using an electronic control unit. An illumination state of a respective illumination device can be adjusted by color component values and a brightness end value for all color channels. The electronic control unit calculates a color value from the illumination state to be adjusted for each color channel based on the color component value of the respective color channel and the brightness value. The color value is supplied to the respective illumination device. The electronic control unit processes a brightness threshold value used during a dimming-down/dimming-up process for switching-off/on the respective illumination device. The (Continued)

brightness threshold value is determined by the electronic control unit and increases as the lowest color component value decreases.

11 Claims, 2 Drawing Sheets

(51) Int. Cl.
*B60Q 3/80* (2017.01)
*H05B 47/18* (2020.01)

(56) References Cited

U.S. PATENT DOCUMENTS

| | | |
|---|---|---|
| 2015/0237700 A1 | 8/2015 | Woytowitz |
| 2017/0144584 A1* | 5/2017 | Asaoka .............. G06K 9/00805 |

FOREIGN PATENT DOCUMENTS

| | | |
|---|---|---|
| DE | 10 2012 013 039 A1 | 4/2014 |
| EP | 1 445 987 A1 | 8/2004 |
| WO | WO 2017/106598 A1 | 6/2017 |

OTHER PUBLICATIONS

German-language Written Opinion (PCT/ISA/237) issued in PCT Application No. PCT/EP2019/068235 dated Sep. 5, 2019 (six (6) pages).
German-language Office Action issued in German Application No. 10 2018 212 274.1 dated Jan. 17, 2019 (seven (7) pages).

* cited by examiner

METHOD FOR OPERATING A LIGHTING DEVICE IN A MOTOR VEHICLE

BACKGROUND AND SUMMARY OF THE INVENTION

The present subject matter relates to a method for operating a lighting device in a motor vehicle and to a corresponding lighting device.

Illumination devices can generate colored light in a motor vehicle, in which the brightness and the color mixing of the light can be suitably controlled. It is often desirable for such illumination devices to be switched on and switched off based on a continuous, rather than abrupt, dimming process.

In motor vehicles, colored illumination devices can be controlled based on color values for corresponding color channels of the illumination device. These color values are ascertained from color component values indicating the color components of the color channels in the mixed color to be generated, and a common brightness value for all the color components. In the case of illumination devices of this type, the color values are generally calculated with a predefined resolution or accuracy. Often only integer color values are possible. Accordingly, for specific colors or in the event of large differences in the color components of the mixed color, so-called color demixing can occur during dimming, i.e., the mixed color can no longer be set correctly in the case of lower brightness values since a color value falls completely to zero because of the limited resolution of the color values.

To avoid the above problem, a minimum brightness threshold value can be predefined during a dimming process. Based on the minimum brightness threshold value, the color values for the illumination devices can be calculated in the case of brightness values below the minimum brightness threshold value. However, this minimum brightness threshold value is predefined universally, independently of the current operating state of the respective illumination device, and can result, under certain circumstances, in the light generated by the respective illumination device being switched on and switched off abruptly during the dimming process.

It is an object of the present subject matter to provide a method for operating a lighting device in a motor vehicle which, during a dimming process of one or more illumination devices, avoids color demixing to the greatest possible extent and at the same time, minimizes sudden changes in brightness.

The method according to the present subject matter serves for operating a lighting device in a motor vehicle, wherein the lighting device comprises a number of illumination devices that each generate colored light with a plurality of color channels. A red color channel, a green color channel and a blue color channel preferably exist. The number of illumination devices is controlled using an electronic control unit. The term electronic control unit should be understood broadly. The electronic control unit can be a separate electronic control unit which controls a plurality of illumination devices simultaneously, for example, using control signals on a communication bus. It is likewise possible for the electronic control unit to be an integral part of the respective illumination device and to serve only for controlling this illumination device.

In the electronic control unit an illumination state to be set for a respective illumination device is given by color component values of the respective color channels in the light color to be generated of the respective illumination device and a brightness value valid for all the color channels. During normal operation (i.e. operation without dimming down or up), the electronic control unit calculates, from the illumination state to be set for each color channel, a color value based on the color component value of the respective color channel and the brightness value. The calculated color values are provided to the respective illumination device by the electronic control unit, to which the illumination device sets its illumination based on these color values.

The electronic control unit furthermore processes a brightness threshold value, which is used when carrying out a dimming-down process for switching off the respective illumination device and/or a dimming-up process for switching on the respective illumination device, and in this case, ensures that in the context of the dimming-down process and/or the dimming-up process, corresponding color values provided to the respective illumination device and are not equal to zero have always been calculated by the electronic control unit based on brightness values greater than the brightness threshold value or based on brightness values greater than or equal to the brightness threshold value. In the context of the dimming down and/or dimming up, a departure is made from normal operation in that instead of the brightness value of the illumination state to be set, the brightness threshold value is used for calculating the color values.

The method according to the present subject matter is distinguished by the fact that the brightness threshold value is determined by the electronic control unit at the beginning of the dimming-down process and/or the dimming-up process such that the brightness threshold value depends on the lowest color component value that is not equal to zero from the color channels for the current operating state of the respective illumination device and increases as the lowest color component value decreases. Depending on the configuration, the current operating state should be understood to mean the operating state currently to be set or the operating state currently set.

The method according to the present subject matter enables a dynamic determination of brightness threshold values depending on the lowest color component value at the beginning of a dimming-down and/or dimming-up process. By the brightness threshold value becoming higher as the lowest color component value becomes lower, color demixing during dimming is avoided to the greatest possible extent. At the same time, it is possible to minimize the sudden change in brightness when the respective illumination device is switched on and switched off.

In one preferred configuration, when carrying out the dimming-down process, the electronic control unit decreases the brightness values proceeding from the current operating state of the respective illumination device progressively until a brightness end value valid for the dimming-down process is reached, without altering the color component values in this case. The brightness end value valid for the dimming-down process is preferably a brightness value of zero in this case. In this embodiment, until the brightness threshold value is reached by the progressively decreased brightness values, the electronic control unit calculates the corresponding color values from the progressively decreased brightness values and the unaltered color component values. The electronic control unit provides these color values to the respective illumination device. By contrast, when the progressively decreased brightness values fall below the brightness threshold value, the electronic control unit switches off the respective illumination device or it provides the color values calculated from the brightness threshold value and the unaltered color component values as constant color values to the respective illumination device. In the case of switching off upon falling below the brightness threshold value, the dimming-down process is ended as early as possible. By contrast, the provision of constant color values upon falling below the brightness threshold value ensures that dimming-down process always require the same period of time.

In a further configuration of the method according to the present subject matter, when carrying out the dimming-up process, the electronic control unit increases the brightness values proceeding from the current operating state of the respective illumination device progressively until a brightness end value valid for the dimming-up process is reached, without altering the color component values in this case. The brightness end value valid for the dimming-up process is, for example, the maximum brightness of the respective illumination device or else optionally a low brightness value. In this embodiment, the electronic control unit keeps the respective illumination device in the switched-off state until the brightness threshold value is reached by the progressively increased brightness values. Alternative, the electronic control unit provides the color values calculated from the brightness threshold value and the unaltered color component values as constant color values to the respective illumination device. Switching off the respective illumination device until the brightness threshold value is reached shortens the dimming-up process. By contrast, the use of constant color values makes it possible for all dimming-up processes to begin directly and always have a duration of equal length.

If, in the embodiment above, the brightness threshold value is exceeded by the progressively increased brightness values during dimming up, the electronic control unit calculates the corresponding color values from the progressively increased brightness values and the unaltered color component values. The electronic control unit subsequently provides these values to the respective illumination device.

In one particularly preferred embodiment of the method according to the present subject matter, the electronic control unit calculates a color value for a respective color channel such that the color value for the respective color channel contains the product of the color component value of the respective color channel and the brightness value. In other words, the color value increases as the color component value and the brightness value increase.

In a further preferred configuration of the method according to the present subject matter, the electronic control unit determines the brightness threshold value such that the brightness threshold value is indirectly proportional to the lowest color component value that is not equal to zero from the color channels for the current operating state of the respective illumination device.

In a further, particularly preferred embodiment, the color values are integer values and the brightness threshold value of a respective color channel is calculated such that a calculated color value of less than 10, in particular less than 5, and preferably of 1, results from the lowest color component value that is not equal to zero from the color channels and the brightness threshold value. In this way, the brightness threshold value takes account of the limited accuracy in the use of integer color values. It is possible, in line with requirements, to achieve a dimming process substantially without color demixing and small sudden changes in switching on and switching off.

The illumination devices used in the method according to the present subject matter can be configured differently. What is essential to the present subject matter in this case is that the illumination devices can generate colored light taking account of a plurality of color channels. In one particularly preferred configuration, the plurality of illumination devices comprise one or more RGB LED units. These units each contain one red, one green and one blue LED, which are controlled with the corresponding color values.

In a further configuration of the method according to the present subject matter, the color values are provided to a respective illumination device by the electronic control unit with the interposition of a communication bus. The communication bus is preferably the LIN bus (LIN=Local Interconnect Network).

The lighting device operated by the method according to the present subject matter can be installed at arbitrary locations in the motor vehicle. In one preferred configuration, the lighting device is an interior lighting facility in the motor vehicle, in particular an ambient interior lighting facility. Nevertheless, the lighting device can also be an exterior lighting facility on the exterior of the motor vehicle.

Besides the method described above, the present subject matter relates to a lighting device for a motor vehicle, wherein the lighting device comprises a number of illumination devices which, during operation, each generate colored light with a plurality of color channels. An electronic control unit is provided in the lighting device in order to control the number of illumination devices, wherein the electronic control unit is configured such that in the electronic control unit an illumination state to be set for a respective illumination device is given by color component values of the respective color channels and a brightness value valid for all the color channels, and the electronic control unit, during normal operation, calculates from the illumination state to be set for each color channel a color value based on the color component value of the respective color channel and the brightness value and provides it to the respective illumination device, which sets its illumination based on the color values provided.

The electronic control unit of the lighting device according to the present subject matter is furthermore configured to process a brightness threshold value which is used when carrying out a dimming-down process for switching off the respective illumination device and/or a dimming-up process for switching on the respective illumination device and in this case ensures that in the context of the dimming-down process and/or the dimming-up process corresponding color values which are provided to the respective illumination device and are not equal to zero have always been calculated by the electronic control unit based on brightness values greater than the brightness threshold value or based on brightness values greater than or equal to the brightness threshold value.

The lighting device according to the present subject matter is distinguished by the fact that the electronic control unit is configured to determine the brightness threshold value at the beginning of the dimming-down process and/or the dimming-up process such that the brightness threshold value depends on the lowest color component value that is not equal to zero from the color channels for the current operating state of the respective illumination device and increases as the lowest color component value decreases.

In one preferred configuration, the lighting device according to the present subject matter is configured for carrying out one or more preferred variants of the method according to the present subject matter.

The present subject matter furthermore relates to a motor vehicle comprising one or more lighting devices according to the present subject matter or according to one or more preferred variants of the present subject matter.

An example embodiment of the present subject matter is described in detail below with reference to the accompanying figures.

DETAILED DESCRIPTION OF THE DRAWINGS

An embodiment of the present subject matter is explained below based on the lighting device shown schematically in FIG. 1. This lighting device comprises a module 3 indicated by dashed lines, which module is installed in the roof lining of a motor vehicle in the region between the driver's seat and the passenger's seat and, in the example embodiment shown, contains two illumination devices in the form of RGB LED units 4 and 5. The RGB LED units each contain one red, one green and one blue LED and generate ambient interior light in the form of a colored light cone. The LED units 4 and 5 are controlled using an electronic control unit 1 provided in the motor vehicle, the electronic control unit being connected to the module 3 via a LIN bus 2.

The electronic control unit passes color values for red, green, and blue to the LIN bus in regular update cycles. Both RGB LED units are then controlled simultaneously based on these color values. The color value for red serves for controlling the red LED, the color value for green for controlling the green LED and the color value for blue for controlling the blue LED in each of the two RGB LED units 4 and 5. In the context of the control, the current or the voltage that is fed to the individual LEDs is set by via pulse width modulation depending on the color value. The color values are also designated hereinafter as FR for the red color, FG for the green color and FB for the blue color. The color values are positive integer values in the embodiment described here.

Figure 2:
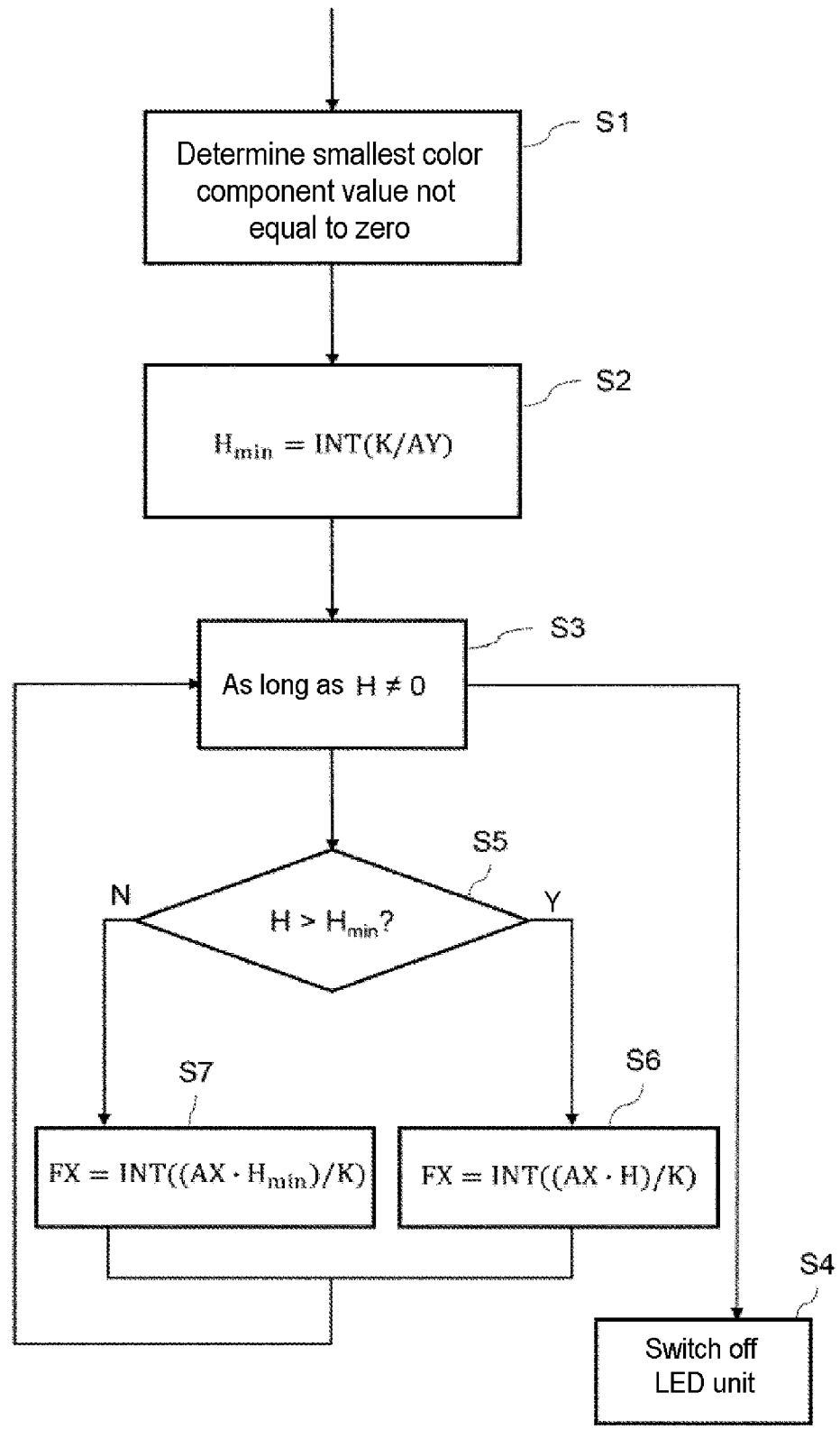
FIG. 2 shows a flow diagram that reproduces one variant of the method according to the present subject matter for the operation of the lighting device from FIG. 1.

The color values are ascertained in the electronic control unit 1 proceeding from an operating state of the RGB LED units 4 and 5 that is currently to be set. The operating state that is currently to be set, designated by BZ in FIG. 2, is described by a color component value AR for the red color channel KR, by a color component value AG for the green color channel KG and by a color component value AB for the blue color channel KB. At the same time, a common brightness value H for all the color channels is defined for the operating state that is currently to be set. The color component values describe the desired mixed color composed of red, green, and blue which is intended to be emitted by the respective RGB LED unit. In this case, the color component value describes the proportion of the total mixed color that is constituted by the corresponding color. In the embodiment described here, the color component values are integer values of between 0 and 254. The brightness value is likewise represented by a value of between 0 and 254.

In the electronic control unit 1, the color values FR, FG and FB mentioned above, which are also indicated in FIG. 2, are ascertained from the color component values and the brightness value for the operating state that is currently to be set. In the example embodiment described here, these color values are calculated based on the following formula:

$$FX = \text{INT}((AX \cdot H)/K) \qquad (1)$$

In this case, X=R, G, B (red, green, blue) holds true. K is a scaling constant, wherein K=254 holds true in the example embodiment described here. In this case, INT is the integer function, which cuts off the decimal places from the argument.

In the context of switching on and switching off the LED units 4 and 5, a dimming-down process and a dimming-up process, respectively, are carried out using the electronic control unit 1. Chiefly, the dimming-down process is explained below, and the dimming-up process proceeding in the same way. During the dimming-down process, in the electronic control unit 1, the same color component values AR, AG and AB are always used for calculating the color values FR, FG and FB, but the brightness value H is progressively decreased. Conventionally there is the problem that the calculation of the color values in accordance with formula (1) above has the effect that color values fall to zero in the case of smaller brightness values. Consequently, undesired color demixing occurs in the case of smaller brightness values.

To avoid this, a minimum brightness threshold value can be defined, upon the reaching of which, while progressively decreasing the brightness value, the brightness is kept constant until the respective LED unit is completely switched off. The brightness threshold value is defined independently of the operating state that is currently to be set. For specific mixed colors, this value can turn out to be too high and result in the LED units being switched off abruptly during the dimming-down process.

To solve the above problem, the present subject matter proposes suitably defining the brightness threshold value proceeding from the current operating state at the beginning of the dimming-down process and/or dimming-up process depending on said operating state in order thereby to avoid to the greatest possible extent not only color demixing but also abrupt switching off and/or switching on of the RGB LED units.

Figure 1:
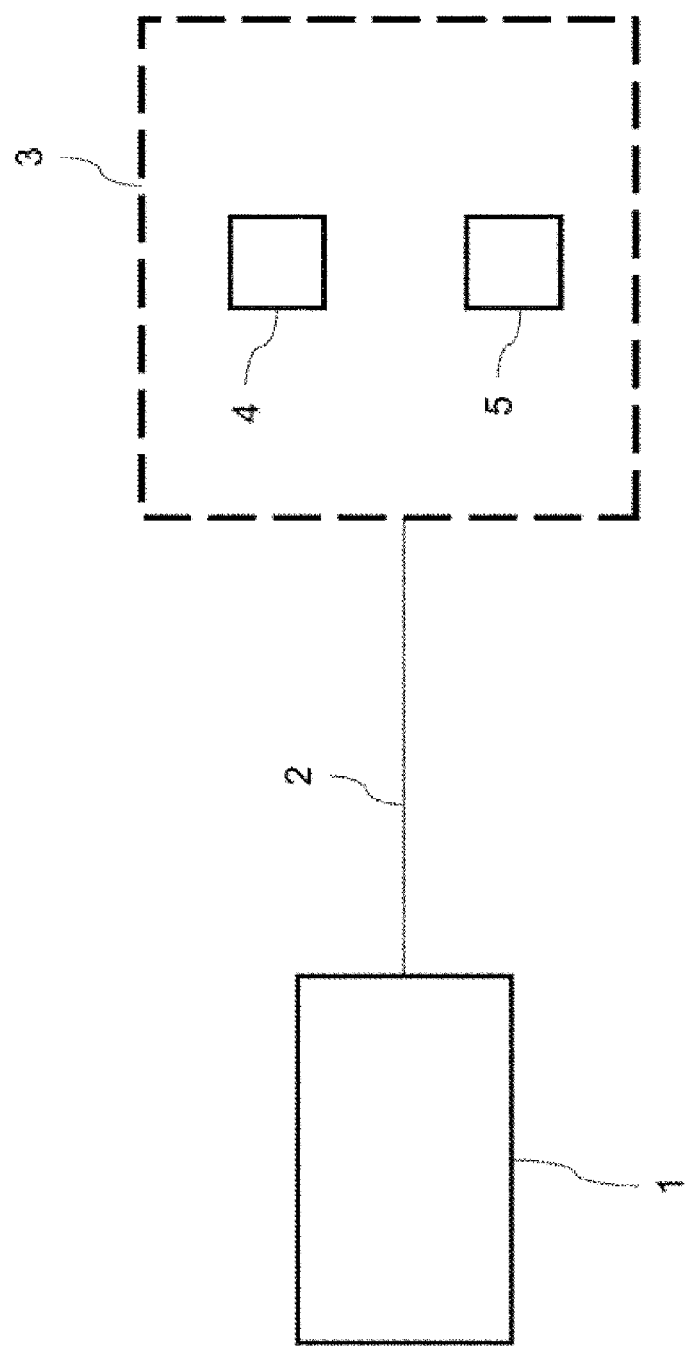
FIG. 1 shows a schematic illustration of one embodiment of a lighting device according to the present subject matter in a motor vehicle.

The choice of the brightness threshold value depending on the current operating state at the beginning of the dimming-down process is explained for the lighting device from FIG. 1 based on the flow diagram in FIG. 2. As already set out above, the electronic control unit calculates the color values FR, FG, FB for an operating state BZ that is currently to be set from the color component values AR, AG, AB for the color channels KR, KG and KB and the brightness value H based on formula (1) above. During the dimming-down process, which can be initiated, for example, in response to a command input via a user interface in the motor vehicle, a departure is made from this general procedure for determining the color values. Instead, using the electronic control unit 1, from the color component values for the operating state BZ that is currently to be set, or alternatively from the operating state BZ that is currently set, the smallest color component value is first ascertained that is greater than 0. This is illustrated in step S1 of FIG. 2.

In accordance with step S2, the electronic control unit 1 determines the brightness threshold value $H_{min}$ depending on the smallest color component value as follows:

$$H_{min} = \text{INT}(K/AY) \qquad (2)$$

In this case, AY (Y=R or G or B) represents the smallest color component value ascertained in step S1. The choice of this brightness threshold value prevents a color value from being able to fall to zero in the context of the dimming-down process. The brightness value H is then progressively decreased in the context of the dimming-down process. In this case, after each decrease a check is made as to whether the new brightness value is not equal to 0 (step S3 of FIG. 2). If H=0 holds true, the dimming-down process is ended and the LED units 4, 5 are switched off (step S4). By contrast, if the currently decreased brightness value is not equal to 0, a check is made as to whether this value is greater than $H_{min}$ (step S5). If this is case (branch Y from step S5), the currently decreased brightness value H is used as brightness value for determining the color values FR, FG, and FB, i.e. the color values FR, FG and FB that are passed to the communication bus 2 are determined in accordance with formula (1) above as follows (step S6 in FIG. 2):

$$FX=INT((AX \cdot H)/K)$$

wherein X=R, G, B.

This takes account of the fact that yet no color demixing occurs since the brightness value is still greater than $H_{min}$. A transition is subsequently made to a new decreased brightness value, i.e. the method returns to step S3.

By contrast, if the currently decreased brightness value falls below the brightness threshold value $H_{min}$ (branch N from step S5), H is kept at $H_{min}$, i.e. the brightness threshold value $H_{min}$ is always used for calculating FR, FG, and FB until H=0 is reached (step S7 in FIG. 2). In other words, the color values FR, FG, and FB are calculated as follows in this case:

$$FX=INT((AX \cdot H_{min})/K) \quad (3)$$

wherein X=R, G, B.

These color values are passed to the communication bus 2 by the electronic control unit 1, such that the LED units emit with the same color and brightness until they are finally switched off. In this case, the sudden change in brightness during switching off is minimized by the choice of the brightness threshold value, and at the same time color demixing is avoided to the greatest possible extent.

The principle above is also used in the context of a dimming-up process in the lighting device from FIG. 1. At the beginning of the dimming-up process, i.e. proceeding from the brightness value H=0, the LED units 4, 5 are immediately activated with the brightness threshold value $H_{min}$, i.e, the color values FR, FG and FB are set according to the formula (3). In this way, color demixing at the beginning of the dimming-up process is avoided to the greatest possible extent. Afterward, the brightness threshold value H is progressively increased. In this case, the brightness threshold value H is used for the calculation of the color values FR, FG, and FB until the brightness value is greater than $H_{min}$. In other words, FR, FG, and FB are calculated based on formula (3) until the brightness threshold value $H_{min}$, is exceeded. After the exceeding, FR, FG and FB are determined based on the current brightness value, i.e., using formula (1). The dimming-up process then ends when a predefined brightness value is reached, which can be for example the maximum brightness value that can be set for the LED units 4 and 5 or a brightness value predefined by the user.

The above-described embodiments of the present subject matter have a number of advantages. The method of the present subject matter enables a dynamic determination of a brightness threshold value during a dimming process depending on the color mixing to be set of the respective LED units. In this way, it is possible to avoid color demixing during dimming to the greatest possible extent and at the same time to minimize as much as possible sudden changes in brightness. This makes possible a pleasant process for the user of dimming down and/or dimming up of LED units in a motor vehicle.

LIST OF REFERENCE SIGNS

1 Electronic control unit
2 Communication bus
3 Module
4, 5 RGB LED illumination devices
BZ Operating state
AR, AG, AB Color component values
KR, KG, KB Color channels
H Brightness value
FR, FG, FB Color values
$H_{min}$ Brightness threshold value
K Scaling constant
S1, S2, . . . , S8 Steps

What is claimed is:

1. A method for operating a lighting device in a motor vehicle, comprising:
calculating, by the electronic control unit, a color value from an illumination state to be set for a respective illumination device of a plurality of illumination devices, wherein
the illumination state is defined by:
a plurality of color component values of a plurality of color channels; and
a brightness end value of the plurality of color channels; and
the color value is calculated for each color channel of the plurality of color channels based on:
a color component value of a respective color channel of the plurality of color channels; and
a brightness value;
providing, by an electronic control unit, the color value to a respective illumination device of the plurality of illumination devices that each generate colored light via the plurality of color channels based on the provided color value;
determining, by the electronic control unit, a brightness threshold value at the beginning of a dimming-down process for switching off a respective illumination device of the plurality of illumination devices and/or a dimming-up process for switching on a respective illumination device of the plurality of illumination devices, wherein
the brightness threshold value depends on a lowest color component value that is not equal to zero from the plurality of color channels for a current illumination state of a respective illumination device; and
the brightness threshold value increases as the lowest color component value decreases; and
ensuring, during the dimming-down process and/or the dimming-up process, that the color value provided to the illumination devices is:
not equal to zero; and
calculated by the electronic control unit based on brightness values greater than or equal to the brightness threshold value.

2. The method according to claim 1, further comprising:
when carrying out the dimming-down process, decreasing, by the electronic control unit, the brightness values of the current illumination state of the respective illumination device progressively until the brightness end value for the dimming-down process is reached without altering the color component values;

until the brightness threshold value is reached by the progressively decreased brightness values:

calculating, by the electronic control unit, the corresponding color value from the progressively decreased brightness value and the unaltered color component values; and providing, by the electronic control unit, the corresponding color value to the respective illumination device; and when the progressively decreased brightness values fall below the brightness threshold value:

switching off, by the electronic control unit, the respective illumination device; or providing, by the electronic control unit, the color values calculated from the brightness threshold value and the unaltered color component values as constant color values to the respective illumination device.

3. The method according to claim 1, further comprising:

when carrying out the dimming-up process:

increasing, by the electronic control unit, the brightness values of the current illumination state of the respective illumination device progressively until the brightness end value for the dimming-up process is reached without altering the color component values; and until the brightness threshold value is reached by the progressively increased brightness values:

keeping, by the electronic control unit, the respective illumination device in the switched-off state; and providing, by the electronic control unit, the color values calculated from the brightness threshold value and the unaltered color component values as constant color values to the respective illumination device; and when the brightness threshold value is exceeded by the progressively increased brightness values:

calculating, by the electronic control unit, the corresponding color values from the progressively increased brightness values and the unaltered color component values; and providing the corresponding color values to the respective illumination device.

4. The method according to claim 1, wherein the color value is calculated for the illumination state to be set for each respective color channel such that the color value for the respective color channel contains a product of the color component value of the respective color channel and the brightness value.

5. The method according to claim 1, wherein the brightness threshold value is determined by the electronic control unit such that the brightness threshold value is indirectly proportional to the lowest color component value that is not equal to zero of the color channels for the current illumination state of the respective illumination device.

6. The method according to claim 1, wherein the color values are integer values; and the brightness threshold value of a respective color channel is calculated such that a calculated color value of 1 results from the lowest color component value that is not equal to 0 from the color channels for the current illumination state of the respective illumination device.

7. The method according to claim 1, wherein the plurality of illumination devices comprises one or more RGB LEDs.

8. The method according to claim 1, wherein the color values are provided to a respective illumination device with the interposition of a communication bus.

9. The method according to claim 1, wherein the lighting device is an interior lighting facility in the motor vehicle or an exterior lighting facility on the exterior of the motor vehicle.

10. A lighting device for a motor vehicle, comprising:

a plurality of illumination devices that each generate colored light via a plurality of color channels; and an electronic control unit to:

control the plurality of illumination devices;

calculate a color value for an illumination state to be set for a respective illumination device of the plurality of illumination devices, wherein the illumination state is defined by:

a plurality of color component values of the plurality of color channels; and a brightness end value of the plurality of color channels; and the color value is calculated for each color channel of the plurality of color channels based on:

a color component value of a respective color channel of the plurality of color channels; and a brightness value;

provide the color value to a respective illumination device of the plurality of illumination device that generates the colored light via the plurality of color channels based on the provided color value;

determine a brightness threshold value at the beginning of a dimming-down process for switching off a respective illumination device of the plurality of illumination devices and/or a dimming-up process for switching on a respective illumination device of the plurality of illumination devices, wherein the brightness threshold value depends on a lowest color component value that is not equal to zero from the plurality of color channels for a current illumination state of a respective illumination device; and the brightness threshold value increases as the lowest color component value decreases; and ensure, during the dimming-down process and/or the dimming-up process, that the color value provided to the illumination device is:

not equal to zero; and calculated based on brightness values greater than or equal to the brightness threshold value.

11. A motor vehicle comprising one or more lighting devices of claim 10.

* * * * *